United States Patent
Baumann

(10) Patent No.: US 7,201,188 B2
(45) Date of Patent: Apr. 10, 2007

(54) FLUTED RECIPROCATING BALL VALVE

(76) Inventor: Hans D. Baumann, 32 Pine St., Rye, NH (US) 03870

( * ) Notice: Subject to any disclaimer, the term of this patent is extended or adjusted under 35 U.S.C. 154(b) by 72 days.

(21) Appl. No.: 10/926,426

(22) Filed: Aug. 26, 2004

(65) Prior Publication Data

US 2006/0042702 A1    Mar. 2, 2006

(51) Int. Cl.
 *F16K 1/52* (2006.01)
(52) U.S. Cl. .................. 137/625.33; 251/121
(58) Field of Classification Search .......... 137/625.33, 137/625.37; 251/118, 121
 See application file for complete search history.

(56) References Cited

U.S. PATENT DOCUMENTS

| | | | | |
|---|---|---|---|---|
| 2,704,549 A | * | 3/1955 | Stmad | 137/469 |
| 3,417,776 A | * | 12/1968 | Ludwig | 137/512.5 |
| 3,730,224 A | * | 5/1973 | Prisk | 137/625.33 |
| 3,851,668 A | * | 12/1974 | Benjamin | 137/625.3 |
| 3,971,411 A | * | 7/1976 | Baumann | 137/625.3 |
| 4,562,861 A | * | 1/1986 | Payton | 137/493.9 |
| 4,705,071 A | * | 11/1987 | Connors et al. | 137/625.3 |
| 5,183,068 A | * | 2/1993 | Prosser | 137/1 |
| 5,318,270 A | * | 6/1994 | Detanne et al. | 251/120 |
| 6,588,725 B1 | * | 7/2003 | Wisnieski et al. | 251/123 |

* cited by examiner

*Primary Examiner*—John Fox

(57) ABSTRACT

The device described herein is a valve suitable for the control or shut-off of fluid flow in a piping system. It comprises a valve housing having inlet and outlet ports and a cylindrical bore whose axis is slanted at about 90 degrees in relation to the axis connecting said inlet port. A ball or closure member being slidingly arranged within said cylindrical bore and being capable of making tight contact with a fixed or flexible seating surface and wherein said cylindrical bore has one or more radially outwardly protruding flutes or grooves providing a fluid path around said ball or closure member. Additional means to allow for the ball or closure member to connect to a conventional actuating device having linear output motion.

3 Claims, 1 Drawing Sheet

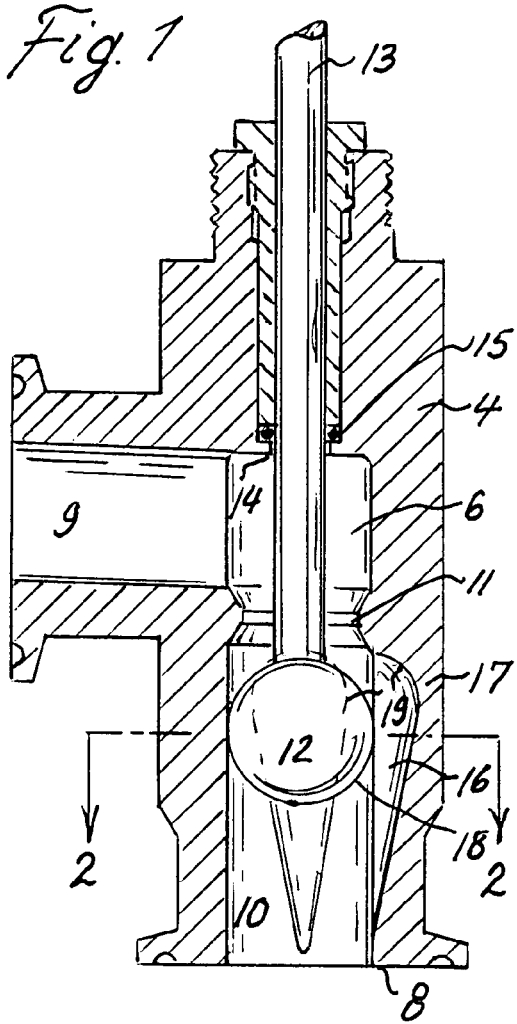
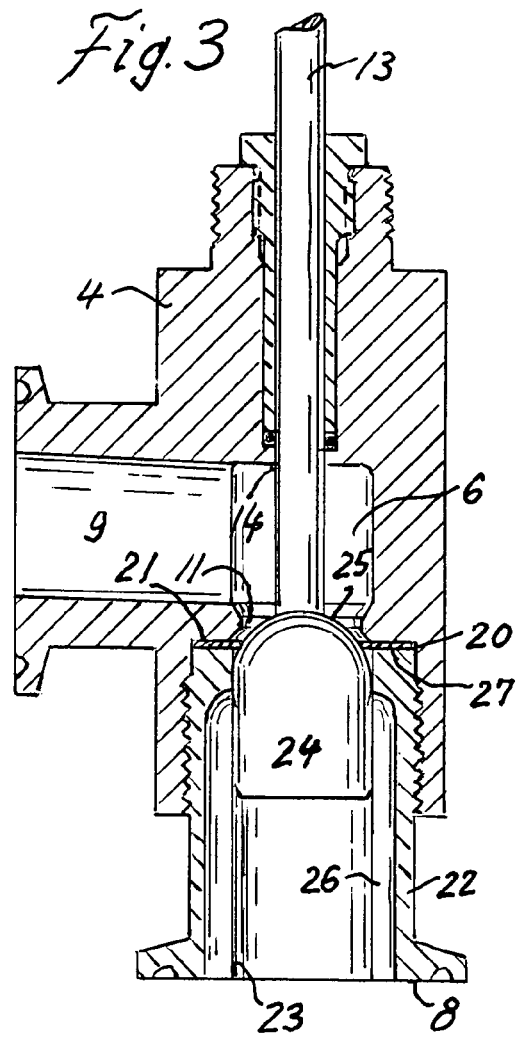
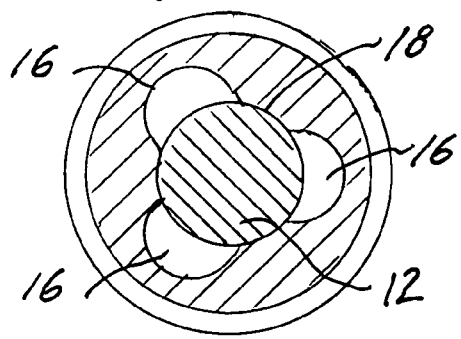

FLUTED RECIPROCATING BALL VALVE

TECHNICAL FIELD

The control valve described herein makes known an apparatus enabling the control of high-pressure fluids within a piping system capable of closing or modulating flow of gaseous or liquid fluids following the commands of a reciprocating actuating device.

BACKGROUND

Control valves are commonly used to control the fluid passing through a pipe. As known to those skilled in the art, a control valve regulates the rate of fluid flow as the position of the valve plug is changed by an actuator. There are three important features of a control valve, such as a globe valve, that it must contain the fluid without external leakage, that it must be able to withstand the pressure and temperature of the fluid, and that the fluid forces acting on the plug or closure element should not cause instability nor prevent the plug from shutting the valve off.

Quite often control valves have to perform under elevated pressure and temperature conditions. While valves with a single seat shut-off configuration and an unbalanced plug provide good service in these applications, they do require substantial forces that have to be provided by an actuator in order to overcome the effects of high fluid pressure acting on such unbalanced plug surfaces. For example, a one inch valve plug needs more than 800 lbs force to close against 1000 psi fluid pressure.

Such actuator force requirements can be quite expensive and such valves face other problems such as stability of operation. A typical example of such a single seated valve is shown in U.S. Pat. No. 4,474,356.

One typical way of alleviating these problems in prior art is the use of a cage with dual seating surfaces for the plug. My prior inventions, shown in U.S. Pat. Nos. 6,536,472 B2 and 3,805,839, describe such a solution. While capable of performing the required tasks, this is a very expensive solution due to the extra, precision machined, parts and due to the extra heavy bonnet bolting that is required to lock the cage within the valve housing. Finally, these valves have an additional problem of absorbing thermal expansion of the cage, especially if cage and housing have to be made of different materials. Another added expense is posed by the requirements to have the seating surfaces of the plugs lapped against opposing surfaces in the seat rings in order to obtain tight shut-off.

This invention relates to my co-pending patent application filed on Jun. 12$^{th}$, 2004 under application Ser. No. 10/871,894 and entitled: Reciprocating Ball Valve.

SUMMARY

The object of my invention is a control valve assembly of low cost and compact configuration, having a favorable flow characteristic and having no crevices that prevent drainage of dangerous or sanitary fluids.

A further objective is to provide for substantial reduction of forces created by fluid pressure acting on the valve plug or closure member thereby eliminating the need for larger and expensive actuating devices.

Yet another objective of my invention is to provide a control valve with parts that can be made from similar materials and, utilizing the use of one flexible valve seal, can overcome the adverse effects of thermal expansion on the sealing capabilities of the valve closure member. Finally, by utilizing a finely polished ball which, when compressing a solid, or a flexible metal seal ring, can provide tight shut-off without resorting to conventional and time consuming lapping procedures. While ball valves are well known in the art, they are utilizing rotary motion for closing or opening of a valve. This in turn requires rotating actuating devices. Such devices are inherently more complicated than simple reciprocating actuators such as a piston and cylinders since rotary actuators require a mechanical interface in order to convert linear into rotary motion.

In accordance with another aspect of my invention, a gradually enlarging flow passage provides a desired flow characteristic by utilizing a characterized opening near an outlet port co-operating with the spherical portion of a ball or closure member.

BRIEF DESCRIPTION OF THE DRAWINGS

FIG. 1 is a central, cross-sectional view of a preferred embodiment of my invention showing the valve in an open position.

FIG. 2 is a partial, cross-sectional view of the outlet portion of the valve housing along the lines 2—2 in FIG. 1.

FIG. 3 is a partial, central, cross-sectional view of an alternate embodiment of my invention incorporating a cage insert and showing the valve in a closed position.

DETAILED DESCRIPTION

Referring to FIG. 1, my fluted reciprocating ball valve comprises a housing 4 preferably made from stainless steel or bronze, and having a central, reduced bore 6, a concentric outlet port 8, and an inlet port 9 whose axis is off-set from that of central bore 6. Housing 4 is configured to attach in a suitable manner to fluid conducting sanitary piping. However it is understood that the housing 4 may also incorporate a pair of pipeline flanges, or threaded connections. Outlet port 8 furthermore features a cylindrical bore 10, connecting to reduced bore 6 via a reduced diameter portion 11 serving as seating means for a spherical closure member 12 slidingly engaging cylindrical bore 10. Closure member 12 is suitably fastened to a valve stem 13 that extends through an opening 14 to the upper exterior of housing 4, and which is further sealed by an o-ring 15. Cylindrical bore 10 has one or more grooves or flutes radially extending into the walled portion 17 of housing 4. The flutes or grooves in the preferred configuration shown commence just below seating means 11 and gradually diminish in depth.

FIG. 2 shows a cross-sectional view of the lower part of housing 4 having three separate flutes with a semi-circular cross-section.

As shown in FIG. 1, a disengagement of closure member 12, here shown as a sphere, from seating surface 11 will result in fluid flow from inlet port 9 to outlet port 8 after first flowing past the outer diameter 18 of closure member 12 and through each flute or groove 16.

As shown by dashed lines in FIG. 1, each flute 16 has a top semi-spherical inlet area 19. This inlet area will gradually be exposed by outer circumference 18 of closure member 12 causing the fluid flow to commence gradually. As a matter of fact, this combination of fluid flow past 11 and then through flutes 16, results in an exponential relationship between fluid flow and valve travel, i.e. the downward motion of closure member 12. The gradual reduction in depth of flutes 16 is especially advantages for valves handling biological fluids or of milk since it facilitates drainage of the valve after use.

FIG. 3 shows an alternative construction of my valve where the actual shut-off of my valve is accomplished by installing a thin flexible sealing ring 20 made preferably from a hardened stainless steel, or a nickel alloy. This sealing ring 20 is retained and compressed against a shoulder 21, being part of housing 4, by a cage insert 22 which is screwed into the lower part of housing 4. This cage insert features a cylindrical bore 23 slidingly engaging a closure member 24 having a generally cylindrical shape and terminating in a semi-spherical upper surface 25, capable of engaging and deflecting the inner circumference of sealing ring 20 in order to provide tight shut off.

Bore 23 furthermore has a number of flutes 26 extending downwards and parallel to the axis of bore 23. As described previously, these flutes can be gradually exposed to fluid flow by the outer circumference of closure member 24.

The advantage of providing a separate cage insert into a valve basically as shown in FIG. 1, is that a flexible metal ring will provide a much higher degree of tightness than a metal to solid metal engagement shown in FIG. 1. Furthermore, it allows the valve housing 4 to be made from an in-expensive material such as bronze or cast iron while only the parts subject to possible wear such as the closure member 12 or the cage insert 22 are made of stainless steel, for example.

The upper terminating end of said valve stem 13 attaches to an actuating device of conventional design and which is actuated by pneumatic, hydraulic or electrical means.

Compared to conventional plug valves, the actuating device in my invention needs substantially less force in order to pull closure member 24 against sealing ring 20 and the fluid pressure exerted from inlet port 9. The reason for this is, that the bore of the seal ring 20 typically is only about 70% of that of a conventional valve seat ring bore for an equivalent amount of fluid flow. Therefore, the fluid forces that a plug, or in this case a ball, has to overcome are 51% less. The reason why a 70% seal diameter is sufficient lies in the fact that my angle style body configuration is much more efficient to conduct fluid flow than the typically complex flow pattern in a globe valve will allow. Further cost reductions are achieved by the use of a commercial ball instead of a custom machined valve plug and by the use of a simple, stamped seal ring replacing a complex, machined seat ring. A final cost saving is achieved by utilizing seal 20 as both, a closure means to prevent fluid flow between inlet and outlet ports when my valve is closed, utilizing the inner circumference of seal 20 in contact with closure element 24, but also as a seal to prevent leakage by the upper surface 27 of cage insert 22 retainer when the outer circumference of seal 20 is pressed against shoulder 21.

While the invention has been explained in preferred configurations, the description is not intended to be construed in a limiting sense. Various modifications and combinations will be apparent to those skilled in the art. For example, the housing may incorporate flanges able to connect to similar flanges of a piping system and that the direction of flow might be reversed from that described. It is more cost effective to use a commercial metal ball for the closure member, Nevertheless a cylindrical valve plug with an upper spherical or conical contour may be used, or a guide ring could be added above the ball, for certain applications, especially for higher pressure applications. Finally, the flexible metal seal may be replaced or supplemented by a seal ring made from a plastic material or, made of rubber.

The invention claimed is:

1. A fluted reciprocating ball valve comprising a housing having an inlet port, a cage insert connected to said valve housing and incorporating an outlet port, seating means straddling the inlet and outlet port, a cylindrical bore being part of said outlet port and slidingly engaging therein a closure member having an exterior diameter and capable of sealingly engaging said seating means, said bore furthermore having at least one or more radially extending grooves along a portion of the length of said bore and capable of passing fluid flow past the exterior diameter of said closure member and essentially parallel to the longitudinal axis of said outlet port and into said outlet port, said grooves have an upper terminus, having a semi-spherical profile and where said exterior circumference of said closure member is capable of covering a portion of said radially extending grooves, said grooves can vary in depth along a portion of the length of said cylindrical bore, said closure member furthermore is suitable connected to a valve stem and is capable of retracting from said seating means in order to selectively uncovering one or more of said grooves in order to produce a desired rate of flow.

2. A fluted reciprocating ball valve as in claim 1, wherein said cage insert has an upper, flat, terminating surface capable of retaining and compressing a flat sealing ring having an outer and an inner circumference and wherein the inner circumference can sealingly engage said closure member.

3. A fluted reciprocating ball valve as in claim 1, wherein the portion of the closure member engaging said seal ring has a semi-spherical profile.

* * * * *